Jan. 18, 1966  A. P. STEWART, JR  3,230,095
METHOD OF STERILIZATION
Filed March 13, 1964
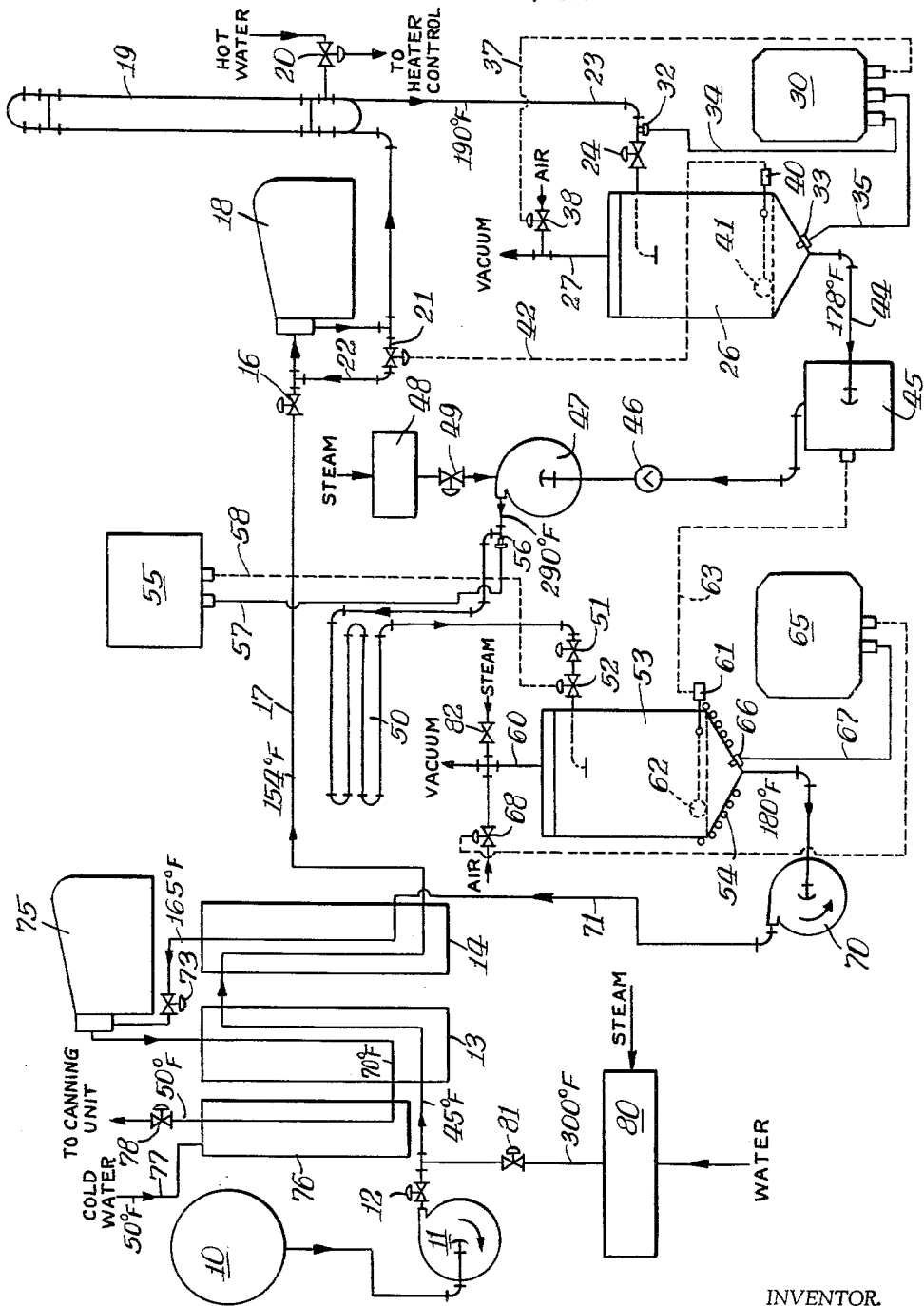
INVENTOR.
Aubrey P. Stewart, Jr.,
BY
Hofgren, Wegner, Allen,
Stellman & McCord Attys.

United States Patent Office 3,230,095
Patented Jan. 18, 1966

3,230,095
METHOD OF STERILIZATION
Aubrey P. Stewart, Jr., Corning, Iowa, assignor to Nodaway Valley Foods, Inc., a corporation of Iowa
Filed Mar. 13, 1964, Ser. No. 351,803
10 Claims. (Cl. 99—212)

This application is a continuation-in-part of my co-pending application Serial No. 108,376, filed May 8, 1961, now abandoned.

This invention relates to a method and apparatus for sterilizing a food product, and more particularly to a high temperature, short time sterilization system for sterilizing a fluid food product prior to canning.

It is well known in technical circles today that high temperature, short time sterilization followed by aseptic canning yields sterile food products having a more superior flavor than the conventional canning processes. This is particularly true in the instance of products such as milk where a cooked flavor is easily developed from excessive heating. The time required for sterilizing milk by the high temperature, short time sterilization process is considerably less than with the conventional method, for example, the conventional "in the can" sterilization process requires a period of 30 to 40 minutes to heat the milk to sterilization temperature and cool it back down to room temperature. During this cycle the milk is held at the sterilization temperature of 245° F. for a period of between 10 and 15 minutes. In contrast, the high temperature, short time sterilization process of this invention wherein the milk is heated to a temperature of between 280° F. and 290° F. and held at this temperature for only a fraction of a minute and then cooled instantaneously, requires a total heating and cooling cycle of less than 5 minutes.

A primary object of this invention is to provide a new and novel method of high temperature, short time sterilization of a fluid food product.

Another object of this invention is to provide a sterilization system for a fluid food product which provides for regenerative heating of the fluid food product and regenerative post-cooling, plus deaeration and initial vacuum cooling after steam injection sterilization.

A further object is to provide a system as described in the preceding paragraph with pressure controls to attain a high temperature sterilization of the fluid product without excessive pressures or pressure differentials.

A further object is to provide a sterilization system for a food product including the use of a steam injection heater whereby the pressure of the food product discharged from the heater is regulated by a back pressure valve to control the temperature of the food product in the heater.

Yet another object of the present invention is to produce a system for sterilizing milk products wherein the solids content of the milk is increased after sterilization or, stated another way, the sterilization takes place with the milk at a lower solids content, thus providing a process which does not tend to destabilize the proteins in the milk.

Further features and advantages of the invention will be readily apparent from the following description and the accompanying schematic diagram of an embodiment of the high temperature, short time sterilization apparatus comprising the invention.

While this invention is susceptible of embodiment in many different forms, there is shown in the drawing and herein will be described in detail, one specific embodiment with the understanding that the present disclosure will be considered as an exemplification of the principles of the invention and is not intended to limit the invention to the embodiment illustrated.

In describing the sterilization system of the invention, a milk food product will be illustrated and the temperatures and pressures designated refer to the sterilization of milk. It is to be understood that variations in the temperature and pressure may be made for various types of food products.

As used herein, the term "milk product" shall be taken to mean the usual dairy milk either in original form or increased in solids content somewhat, as well as synthetic milks of vegetable fat and milk proteins, or animal fat and vegetable proteins, which are often combined to produce a milk-like product. It is contemplated that the portion of the apparatus hereinafter described is adapted to treat milk products which have been concentrated to a solids content of about 34% prior to their introduction into the system.

Referring to the drawing, the non-sterile milk product is stored in a product storage tank 10 at a temperature of 45° F. A centrifugal pump 11 pumps the milk product at a rate of about 460 gallons per hour through a valve 12 and through regenerators 13 and 14 at a pressure of 62 pounds per square inch gauge. The regenerator 13 comprises about 252 feet of 1½" tubing through which the non-sterile milk product flows, surrounded by about 252 feet of 2" tubing. The regenerator 14 comprises about 168 feet of 1½" tubing for the non-sterile milk product which is surrounded by about 168 feet of 2" tubing. The annular space between the 1½" and 2" tubing in both the regenerators provides a passage for the high temperature sterile milk product which heats the non-sterile milk product as will be later described.

As the milk passes through the regenerators 13 and 14, it is heated to 154° F. A back pressure valve 16 is provided in a milk product line 17 following the regenerator 14 and is set to provide a back pressure of from 25 to 75 pounds, and preferably of about 55 pounds per square inch gauge on the milk product in the regenerators. A fixed speed positive displacement pump 18 then pumps the milk product through a tube and shell heater 19 which comprises about 84 feet of 1½" pipe carrying hot water which is surrounded by 2" pipe with the milk product flowing in the annular space therebetween. The 2" pipe is surrounded by 2½" pipe with hot water flowing in the annular space. A control valve 20 which is operated by a heater control (not shown), introduces steam or hot water, from a source not shown, to the heater 19 at a pressure of about 45 pounds per square inch gauge. This heats the milk product leaving the hot water heater 19 to a temperature of 190° F. and this temperature is controlled by the heater control (not shown) on the valve 20 which regulates the amount of hot water or steam introduced to the heater.

A conduit 22 bypasses the pump 18 and has a bypass valve 21 therein which is regulated by air pressure to control the flow output of milk from the pump 18 in a manner that will be later described.

After leaving the hot water heater 19, the milk is passed through a conduit 23 and a back pressure valve 24 to a deaerator tank 26. The valve 24 is regulated by air pressure to establish a back pressure on the milk product at this point of 55 pounds per square inch gauge.

The deaerator tank is designed to reduce the temperature of the milk product by subjecting it to a vacuum to remove all of the air therefrom. A source of vacuum (not shown) is connected to the deaerator tank 26 through a conduit 27 and a 14½" vacuum is pulled on the tank. The 14½" vacuum is sufficient to drop the temperature of the milk product entering the deaerator 12° F. so that it leaves the deaerator tank at 178° F. The 12° drop is sufficient to remove all of the air from the milk product. A differential temperature controller 30 maintains the 12° differential between the milk product entering and leaving the deaerator tank. Thermocouples 32 and 33 are located at the inlet and outlet ports of the deaerator tank, respectively, and are connected to the controller 30 by lines 34 and 35. The controller translates the temperature differential recorded by the thermocouples into a regulating air pressure which is transferred through a line 37 to an air bleed valve 38 that is connected to the vacuum source line 27, thereby regulating the air entering the deaerator and controlling the vacuum pulled in the deaerator tank. The liquid level of the milk product in the deaerator tank is maintained by a control instrument 40 to which a float 41 located within the deaerator tank is connected. The controller 40 translates a movement of the float 41 into air pressure which is transferred through a line 42 to the bypass valve 23 located in the conduit 22 to control the output of the pump 18 and maintain a constant level of milk product in the deaerator tank.

From the deaerator tank 26 the milk product at 178° F. flows through a conduit 44 to a variable speed positive pump 45. The speed of the pump 45 is controlled by differential air pressure as will later be described. From pump 45 the milk is pumped through a check valve 46 to a steam injection heater 47 which consists of an impeller type pump whereby the steam is injected into the milk product as the milk product is pumped through the heater. The particular construction and operation of the steam injection heater is fully described in my copending application entitled "Steam Injection Heater," Serial No. 107,824, filed May 4, 1961. Steam flows to the injection heater 47 through a steam cleaner 48 from an external source (not shown) and then through a valve 49 at a constant pressure which is manually set to provide a constant steam flow to heat the milk product to sterilization temperature (in the range of 290° F.).

From the steam injection heater 47 the milk continues to flow through a length of tubing 50 that is looped so as to be sufficiently long to provide a proper holding time at the 290° temperature to completely sterilize the product. In the described embodiment of the system, the holding time at the 290° F. temperature is about 5 seconds to completely sterilize the milk. This time and temperature, however, may be modified between the limits of 260° F. for two minutes to 310° F. for about one second. The now sterile milk product then flows through back pressure valves 51 and 52, to a flash chamber 53.

The valve 51 is manually set to provide a back pressure on the milk product leaving the injection heater 47 of 55 pounds per square inch gauge which is a pressure sufficiently high to prevent vaporization of the 290° F. milk product between the valve 51 and the steam injection heater.

In order to control the temperature of the milk product as it leaves the steam injection heater 47 a temperature recorder controller 55 has a thermocouple 56 connected thereto by a line 57 and the thermocouple is located in the output of the steam injection heater. The controller 55 translates the temperature sensed by the thermocouple 56 to an air pressure differential which is transferred to the back pressure valve 52 through a line 58 to regulate the opening of the valve passageway to increase or decrease the back pressure on the milk in the heater, and thereby regulate the steam flow through the steam valve 49 which determines the temperature of the milk leaving the heater. As an example, when the temperature of the milk leaving the heater rises above 290° F. the controller 55 will operate to further close the passageway of valve 52 to increase the back pressure on the milk in the steam injection heater 47 higher than the 55 pounds (p.s.i.g.) caused by the back pressure valve 51. This causes less steam flow through the valve 49, thereby reducing the temperature of the milk product at the output of the heater 47. The steam valve 49 is set to provide a slight over sufficiency of steam to maintain the desired temperature of 290° F. and back pressure of 55 (p.s.i.g.) at the given milk product flow rate.

A flash chamber 53 cools the milk product to 180° F. This removes water in the milk from condensation of steam injected in the heater 47. A vacuum of 15 inches is pulled from a vacuum source (not shown) through a conduit 60 connected to the flash chamber 53. The milk product in the flash chamber 53 is maintained at a constant level by a control instrument 61 similar to the controller instrument 40 on the deaerator tank 26 and translates the movement of a float 62 to an air pressure differential which is transferred to the variable speed pump 45 through a line 63 to vary the speed of the pump and the milk product flow into the flash chamber.

In order to exactly control the removal of the water placed in the milk product from condensation of steam introduced in the steam injection heater 47, it is important to carefully control the vacuum pulled in the flash chamber 53 since the vacuum level will determine the degree of water removal from the milk product in the flash chamber. A temperature vacuum controller 65 has a thermocouple 66 located at the outlet port of the flash chamber and connected to the controller 65 by a line 67. The controller 65 translates the temperature sensed by the thermocouple 66 to an air differential pressure and transfers this pressure to an air bleed valve 68 which is connected to the vacuum conduit 60, regulating the valve to control the vacuum in the flash chamber 53 so that the temperature of the milk product leaving the flash chamber will be 180° F.

After leaving the flash chamber 53 at 180° F., the sterile milk product is pumped by a centrifugal pump 70 through a conduit 71 and through the regenerator 14 in the annular recess between the 1½" tube and the 2" tube where it is cooled to 165° F. Then it passes through a valve 73 which is manually set to maintain a back pressure of 65 pounds (p.s.i.g.) on the product. From the valve 73 the milk is pumped by a variable speed positive pump 75 which is set to deliver the proper volume of milk product as required by an aseptic canning unit. The pump 75 pumps the sterile milk product through the regenerator 13 where it exits with a temperature of 70° F. and then through a concentric three tube cooler 76 consisting of about 126 feet of 1½" pipe containing flowing cold water, surrounded by a 2" pipe with the milk product flowing in the annular space therebetween, and the 2" pipe surrounded by a 2½" pipe with cold water flowing in the annular space. The cold water is introduced into the cooler 76 through a conduit 77 from an external source not shown. The milk product exits from the cooler 76 at a temperature of 50° F. and then passes through a valve 78 which is set to provide a back pressure on the milk product between the valve 78 and the pump 75 of at least 55 pounds per square inch gauge. The milk product then continues to flow to the aseptic canning unit (not shown), where it is sealed in cans.

It should be noted that the regenerators 13 and 14 are used as a dual heater and cooler for the milk products. In operation, the non-sterile product at 45° F. is passed through the regenerators and heated to 154° F. by the high temperature sterile milk product that passes through the regenerators at a temperature of 180° F. The sterile product at 180° F. is also cooled as it passes through the regenerators due to the heat loss to the non-sterile product, providing an efficient and economical method of preheating and post cooling the product.

With a minor modification, namely the provision of means to add heat to the flash chamber 53, an improved apparatus and method of treating milk products can be achieved. Thus, by equipping the flash chamber 53 with a source of heat such as the heating coils 54 controllable from a source (not shown) the solids content of the milk product can be increased in the chamber 53. As an example of the improved process, milk concentrated to a solids content of the order of 22% can be introduced into the system and treated as previously described up to the point of entry into the flash chamber 53. By regulating the vacuum in the chamber 53 and the amount of heat applied through the coils 54, the solids content of the milk product can be increased to the desired 34% in this chamber. Because the milk product was not fully concentrated at the time of sterilization, destabilization of the milk product is prevented or greatly reduced, resulting in a superior product. Furthermore, the product can be cooled down to an exit temperature as low as 90° F. rather than the 180° F. previously described, although an exit temperature of 135° F. has been found to be the most desired. From the outlet of the flash chamber 53, the process continues as previously described with the possible exception of the lower temperature of the milk product as it enters the regenerators.

The pressures in the described milk sterilization system are properly balanced to achieve the desired product sterilization. Excessive pressures are not required in the system since the transfer pumps and the pressure relief points (deaeration tank and flash chamber) are properly spaced so as not to require the pumps to operate against long lines or against high resistance.

In the control method described, the back pressure on the milk product itself determines the amount of the steam which can flow into the milk product in the heater, and therefore accurately controls the temperature. The controller instrument 55 regulates the back pressure valve 52 to vary the output temperature from the steam injection heater 47 by placing greater or less pressures on the product discharging from the heater depending on the temperature sensed by the thermocouple 56.

The vapors from the deaerator tank 26 may be used to provide additional heat to the heater 19 to further improve the efficiency of the system. The system can be utilized over a wide range of flow volumes and provides automatic self-regulation of the flow rate, levels in the deaerator and flash chambers, and various temperature and pressure conditions required by the various flow rates.

Deaeration of the food product in the deaerator 26 removes the air from the product which would otherwise produce harmful flavor reactions during the high temperature sterilization and which would also cause excessive foaming in the flash chamber. The flash chamber 53 is helpful in removing any slight cooked flavors which may result from the high temperature, short time sterilization. Where homogenization of the food product is helpful to the flavor and physical properties of the product, as in the case of milk, the pumps 18 and 75 may be in the form of homogenizers to accomplish this result.

It is to be noted that the pressures on the sterile side of the regenerators 13 and 14 are slightly higher (65 pounds per square inch gauge) than on the non-sterile tubes (55 pounds per square inch gauge) to avoid the danger of leakage through gaskets or possible pin hole defects in the tubes, other than from the sterile product side to the non-sterile product side. The same pressure differentials are maintained relative to the product and water sides of the heater 19 and the cooler 76. These pressure differentials are slight and accomplish the result intended without causing undue strain on the tubes themselves or on the gaskets.

Provisions are also made in the system of this invention for efficiently sterilizing the system prior to running the product through. To accompilsh sterilization, water flowing at a rate of 460 gallons per hour is passed through a steam injection heater 80, and heated to 300° F. The valve 12 connected in the food product supply line at the output of the pump 11 is closed and a valve 81 opened allowing the 300° F. water to flow in the inner (1½") tubes of the regenerators 13 and 14 at the 300° temperature so that when the sterilization water is passed through the sterile tubes it will not be cooled. The high temperature water is then pumped through the heater 19, the deaerator 26 into the steam injection heater 47. Heat lost by water flowing through the lines is made up by steam entering the heat injection heater through the valve 49 which increases the temperature of the water back to 300° F. for the important job of completely sterilizing all of the sterile product contact surfaces of the system.

The 300° water is then passed through the holding tubes 50 and the flash chamber 53. No vacuum is pulled on the flash chamber 53 and steam is introduced into the flash chamber through a valve 82 connected to the conduit 60 to maintain a 55 pound square inch gauge pressure in the flash chamber during the sterilization. From the flash chamber, the 300° water is pumped through the regenerator 14, the pump 75, the regenerator 13, and the cooler 76 with pressure conditions maintained throughout the system by the back pressure valves so as not to vaporize the water and lose the high temperature. During sterilization, steam is provided into the water-jacket of the cooler 76 through the conduit 77 so that the sterilization water passing through the cooler is maintained at 300° F. After all contact surfaces have been heated for several minutes at the 300° F. temperature, the valve 81 is closed and valve 12 is opened. The system is now ready for sterilization of the food product from the storage tank 10.

I claim:
1. A method for sterilizing milk products comprising the steps of: preheating the milk product to 190° F.; vacuum cooling the milk product to produce a 12° F. drop in temperature to remove all of the air from the milk product; mixing steam with the milk product to raise the temperature of the milk product to 290° F.; holding the temperature of the milk product at 290° F. for 5 seconds; vacuum cooling the milk product to 180° F. to remove condensation of steam added during the steam heating; cooling said milk product to 70° F.; further cooling the milk product to 50° F. and maintaining a back pressure of from 25 to 75 pounds on the liquid milk product during the treatment thereof.

2. A method for sterilizing a milk product comprising the steps of: regeneratively heating the milk product to 154° F. while maintaining a pressure of 55 pounds per square inch gauge on the product; further heating the milk product to a temperature of 190° F. while maintaining a pressure of from 25 to 70 pounds per square inch gauge on the product; vacuum cooling said milk product to reduce the temperature an amount sufficient to remove all the air therefrom; intimately mixing high temperature steam with said milk product to quickly raise the temperature of the product to a sterilization temperature in the range of 290° F.; holding the temperature of the milk product at 290° F. and at a pressure of 55 pounds per square inch gauge to completely sterilize the product and prevent vaporization thereof; vacuum cooling the food product to 180° F. to remove steam condensation added during steam heating; regeneratively cooling said milk product to 70° F.; and further cooling said milk product to 50° F.

3. An apparatus for sterilizing a milk product prior to aseptic canning comprising: a series of regenerators for preheating the milk product; means for removing all of the air from the milk product while decreasing the temperature thereof; a constant steam pressure injection heater to intimately mix steam with the milk product thereby heating it to a sterilization temperature; a back pressure valve located in the output side of the constant steam pressure injection heater and responsive to a change in the temperature of the milk product leaving said heater and having a passage directly restrictable in response to a temperature change for increasing restriction and decreasing flow therethrough upon increase in temperature, whereby said valve controls the back pressure on the milk product in said heater thereby controlling the flow of steam into the heater; means for holding the milk product at said sterilization temperature for a predetermined period sufficient to sterilize the milk product; means for removing condensation of steam introduced into said steam injector from said milk product; cooling means for said product including said series of regenerators to cool the product to a temperature desirable for aseptic canning while passing the removed heat to the incoming product; and means connecting said apparatus for series flow through said regenerators, air removal means, injection heater, holding means and cooling means, whereby said milk product may pass therethrough.

4. An apparatus for controlling the output temperature of a milk product leaving a constant steam pressure injection heater comprising: a valve located in the output side of said heater responsive to a change in temperature of the product leaving said heater, said valve having a passage communicating with said heater output side and directly restrictable in response to a temperature change of said product, said valve controlling the back pressure on the milk product in said heater and thereby controlling the steam flow into the heater.

5. An apparatus for controlling the output temperature of a milk product leaving a constant pressure steam injection heater comprising: a valve having a passageway therethrough communicating with the output side of said heater; a control instrument responsive to a change in temperature of the product leaving said heater; an operating element associated with said valve for restricting said passageway; means connecting said control instrument to said operating element whereby a change in the temperature of the product leaving said heater causes a corresponding change in the restriction of said valve passageway whereby the back pressure on the product in the heater is varied thereby controlling the steam flow into the heater.

6. A method for sterilizing milk comprising: charging the nonsterile milk sequentially through a pair of in series regeneration zones while maintaining a back pressure of 55 p.s.i. on the milk to heat the milk to a temperature of 154° F.; directing the resulting heated milk through a heating zone to heat the milk to a temperature of 190° F.; introducing the milk to a controlled vacuum atmosphere to reduce the temperature of the milk an amount sufficient to remove all of the air therefrom; charging the milk through a steam injection heating zone and intimately mixing the milk in said steam injection heating zone with high temperature steam to raise the temperature thereof to 290° F.; holding the milk at the 290° F. temperature and at a pressure of 55 p.s.i. for a period of time sufficient to provide sterilization thereof; introducing the milk to a controlled vacuum atmosphere to reduce the temperature thereof to 180° F. and remove steam condensation added during steam heating; charging the resulting lower temperature milk through one of said regeneration zones to reduce the temperature to 165° F. while maintaining the pressure of the milk at 65 p.s.i.; charging the milk through the other of said regeneration zones to lower the temperature to 70° F.; and cooling the milk to 50° F. while maintaining a pressure of 65 p.s.i. on the milk.

7. A method for sterilizing a milk product having a solids content of the order of 20% comprising the steps of: flowing the milk product and heating the same while maintaining a back pressure thereon of between 25 to 75 pounds; vacuum cooling the heated milk product to produce an appreciable drop in temperature sufficient to remove substantially all of the air from the milk product; mixing steam with the milk product to raise the temperature to between 260° F. and 310° F. and holding the same at said temperature from 2 minutes to one second, respectively; vacuum cooling the milk product sufficient to remove condensation of steam added during the steam heating; adding heat to said milk product to increase the solids content thereof to the order of 35%; and thereafter cooling the milk product.

8. The method of claim 7 in which said milk product is cooled to a temperature of between 90° F. and 180° F. during the last recited step of said method.

9. The method of claim 7 in which said milk product is cooled to a temperature of approximately 135° F. during the last recited step of said method.

10. A method for sterilizing milk comprising: flowing a stream of non-sterile milk, said milk being concentrated to a solids content of about 22%; directing the stream of non-sterile milk through sequential regeneration zones while maintaining a back pressure of from 25 to 75 pounds on the milk stream to heat the milk; directing the stream of resulting heated milk through a heating zone to further heat the milk; introducing the stream to a controlled vacuum atmosphere to reduce the temperature of the milk an amount sufficient to remove substantially all of the air therefrom; recollecting the stream and charging the stream through a steam injection heating zone and intimately mixing the milk in said steam injection heating zone with high temperature steam to raise the temperature thereof to a temperature between 260° F. and 310° F.; flowing the milk stream through a holding zone under back pressure at said sterilization temperature for a period of from 2 minutes to one second to provide sterilization thereof; introducing the stream to a controlled vacuum atmosphere to reduce the temperature of the milk and remove steam condensation added during steam heating; adding heat to said milk to increase the solids content thereof to the order of 35%; charging the stream of resulting lower temperature milk through said regeneration zones in opposite sequence to reduce the milk temperature stepwise while maintaining the back pressure on the milk stream; thereafter further cooling the flowing milk stream while maintaining a back pressure; and recovering the stream of milk as product sterilized milk.

References Cited by the Examiner
UNITED STATES PATENTS

| | | | |
|---|---|---|---|
| 2,335,250 | 11/1943 | Adlam | 261—39 XR |
| 2,522,796 | 9/1950 | Olson et al. | 257—2 |
| 2,610,837 | 9/1952 | Puster | 261—39 |
| 2,846,320 | 8/1958 | Wittwer | 99—212 |

A. LOUIS MONACELL, *Primary Examiner.*